United States Patent
Hu (10) Patent No.: US 9,998,704 B2
(45) Date of Patent: Jun. 12, 2018

(54) VIDEO COMMUNICATION METHOD AND SYSTEM, AND TERMINAL

(71) Applicant: Huawei Technologies Co., Ltd., Shenzhen (CN)

(72) Inventor: Yunhui Hu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days. days.

(21) Appl. No.: 15/540,879

(22) PCT Filed: Dec. 28, 2015

(86) PCT No.: PCT/CN2015/099162
§ 371 (c)(1),
(2) Date: Jun. 29, 2017

(87) PCT Pub. No.: WO2016/107511
PCT Pub. Date: Jul. 7, 2016

(65) Prior Publication Data
US 2017/0359550 A1     Dec. 14, 2017

(30) Foreign Application Priority Data
Dec. 31, 2014    (CN) .......................... 2014 1 0857650

(51) Int. Cl.
*H04N 7/15*     (2006.01)
*H04N 7/01*     (2006.01)
*H04N 7/14*     (2006.01)

(52) U.S. Cl.
CPC ........... *H04N 7/0117* (2013.01); *H04N 7/147* (2013.01)

(58) Field of Classification Search
None
See application file for complete search history.

(56) References Cited

U.S. PATENT DOCUMENTS 5,799,040 A * 8/1998 Lau ................... H04L 12/40136
375/258
6,354,748 B1    3/2002 Vrvilo
(Continued)

FOREIGN PATENT DOCUMENTS

CN         101110946 A     1/2008
CN         101755454 A     6/2010
(Continued)

OTHER PUBLICATIONS

Machine Translation and Abstract of Chinese Publication No. CN103139527, Jun. 5, 2013, 10 pages.
(Continued)

*Primary Examiner* — Creighton Smith
(74) *Attorney, Agent, or Firm* — Conley Rose, P.C.

(57) ABSTRACT

A video communication method and system, and a terminal are presented. A sending terminal sends an invite message to a receiving terminal. The sending terminal receives a reply message. The sending terminal determines that a video encoding/decoding format supported by the sending terminal does not include a video encoding/decoding format included in the reply message. The sending terminal obtains a video encoding/decoding format supported by both the sending terminal and the receiving terminal. The sending terminal performs video communication with the receiving terminal by using the obtained video encoding/decoding format.

6 Claims, 3 Drawing Sheets

(56) References Cited

U.S. PATENT DOCUMENTS

| | | | |
|---|---|---|---|
| 6,975,637 B1* | 12/2005 | Lenell | H04L 43/00 370/395.2 |
| 2005/0201336 A1* | 9/2005 | Lee | H04L 12/66 370/335 |
| 2009/0054102 A1 | 2/2009 | Jung | |
| 2012/0044931 A1 | 2/2012 | Harper et al. | |
| 2014/0080547 A1 | 3/2014 | Jung et al. | |
| 2015/0116450 A1 | 4/2015 | Li et al. | |

FOREIGN PATENT DOCUMENTS

| | | | |
|---|---|---|---|
| CN | 102984493 A | 3/2013 | |
| CN | 103096011 A | 5/2013 | |
| CN | 103139527 A | 6/2013 | |
| CN | 103595978 A | 2/2014 | |
| CN | 103702063 A | 4/2014 | |
| CN | 104219479 A | 12/2014 | |
| WO | 2006044069 A1 | 4/2006 | |
| WO | 2014079371 A1 | 5/2014 | |

OTHER PUBLICATIONS

Machine Translation and Abstract of Chinese Publication No. CN104219479, Dec. 17, 2014, 11 pages.
Foreign Communication From a Counterpart Application, PCT Application No. PCT/CN2015/099162, English Translation of International Search Report dated Mar. 31, 2016, 2 pages.
Foreign Communication From a Counterpart Application, PCT Application No. PCT/CN2015/099162, English Translation of Written Opinion dated Mar. 31, 2016, 7 pages.
Foreign Communication From a Counterpart Application, European Application No. 15875188.3, Extended European Search Report dated Jan. 4, 2018, 10 pages.
Machine Translation and Abstract of Chinese Publication No. CN101110946, Jan. 23, 2008, 8 pages.
Machine Translation and Abstract of Chinese Publication No. CN103096011, May 8, 2013, 9 pages.
Machine Translation and Abstract of Chinese Publication No. CN103595978, Feb. 19, 2014, 17 pages.
Machine Translation and Abstract of Chinese Publication No. CN103702063, Apr. 2, 2014, 8 pages.
Foreign Communication From a Counterpart Application, Chinese Application No. 201410857650.8, Chinese Office Action dated Apr. 19, 2018, 9 pages.

* cited by examiner

VIDEO COMMUNICATION METHOD AND SYSTEM, AND TERMINAL

CROSS REFERENCE TO RELATED APPLICATION

This application is a national stage of International Application No. PCT/CN2015/099162, filed on Dec. 28, 2015, which claims priority to Chinese Patent Application No. 201410857650.8, filed on Dec. 31, 2014. Both of the aforementioned applications are hereby incorporated by reference in their entireties.

TECHNICAL FIELD

The present disclosure relates to the field of video communication technologies, and in particular, to a video communication method and system, and a terminal.

BACKGROUND

The Global System for Mobile Communications assembly (GSMA) is greatly promoting rich communication services (RCS). The RCS are mainly implemented by using an enhanced phone book. With the enhanced phone book, a user may directly initiate multiple communication functions, which mainly include an enhanced message and an enhanced call. The enhanced message is mainly a data-based instant message, and content of the message may be a text, a file, a video, audio, or the like. The enhanced call is mainly a data-based voice call and a data-based video call. These services are already commercialized by multiple operators in Europe, South Korea, and the like, and many operators are planning to carry out the RCS. The RCS are a next step into which operators evolve services. There are many opportunities as well as challenges. Currently, China Mobile is prepared to launch pilot commercial RCS next year. In many services, a video communication service is an important part of the RCS.

However, in the prior art, because a mechanism for negotiation between terminals that perform video communication is undesirable, terminals that have video communication capabilities cannot successfully implement video communication. As a result, efficiency and a success rate of video communication are greatly reduced, and many network resources and much electricity are consumed ineffectively. In addition, user experience of a video communication service is unsatisfactory.

SUMMARY

The technical solutions provide a video communication method and system, and a terminal, to improve efficiency and a success rate of video communication.

According to a first aspect, an embodiment of the present disclosure provides a video communication method, where the method includes sending, by a sending terminal, an invite message to a receiving terminal; receiving, by the sending terminal, a reply message that is sent by the receiving terminal according to the invite message, where the reply message includes a video encoding/decoding format supported by the receiving terminal; determining that a video encoding/decoding format supported by the sending terminal does not include the video encoding/decoding format included in the reply message; obtaining, by the sending terminal according to the determining, a video encoding/decoding format supported by both the sending terminal and the receiving terminal; and performing, by the sending terminal, video communication with the receiving terminal by using the obtained video encoding/decoding format.

In a first possible implementation manner of the first aspect, the determining that a video encoding/decoding format supported by the sending terminal does not include the video encoding/decoding format included in the reply message includes determining that a specification of each video encoding/decoding format included in the reply message is higher than that of the video encoding/decoding format supported by the sending terminal; and the obtaining, by the sending terminal according to the determining, a video encoding/decoding format supported by both the sending terminal and the receiving terminal includes obtaining, by the sending terminal according to the determining, a video encoding/decoding format of a highest specification supported by the sending terminal, or obtaining a default video encoding/decoding format according to the determining.

With reference to the first aspect, or the first possible implementation manner of the first aspect, in a second possible implementation manner, the determining that a video encoding/decoding format supported by the sending terminal does not include the video encoding/decoding format included in the reply message includes determining that each video encoding/decoding format included in the reply message is lower than the video encoding/decoding format supported by the sending terminal; and the obtaining, by the sending terminal according to the determining, a video encoding/decoding format supported by both the sending terminal and the receiving terminal includes obtaining, by the sending terminal according to the determining, a video encoding/decoding format of a lowest specification supported by the sending terminal, or obtaining the default video encoding/decoding format.

With reference to either of the first possible implementation manner and the second possible implementation manner of the first aspect, in a third possible implementation manner, the default video encoding/decoding format is a preset video encoding/decoding format supported by both the sending terminal and the receiving terminal.

According to a second aspect, an embodiment of the present disclosure provides a video communication method, where the method includes receiving, by a receiving terminal, an invite message sent by a sending terminal, where the invite message includes a video encoding/decoding format supported by the sending terminal; obtaining, by the receiving terminal according to the invite message, a video encoding/decoding format supported by both the receiving terminal and the sending terminal; sending, by the receiving terminal, a reply message to the sending terminal, where the reply message includes the obtained video encoding/decoding format; and performing, by the receiving terminal, video communication with the sending terminal by using the obtained video encoding/decoding format.

In a first possible implementation manner of the second aspect, the obtaining, by the receiving terminal according to the invite message, a video encoding/decoding format supported by both the receiving terminal and the sending terminal includes determining that a specification of each video encoding/decoding format supported by the receiving terminal is higher than that of the video encoding/decoding format included in the invite message; and obtaining, by the receiving terminal according to the determining, a video encoding/decoding format of a lowest specification supported by the receiving terminal, or obtaining a default video encoding/decoding format according to the determining.

With reference to the second aspect, or the first possible implementation manner of the second aspect, in a second possible implementation manner, the obtaining, by the receiving terminal according to the invite message, a video encoding/decoding format supported by both the receiving terminal and the sending terminal includes determining that each video encoding/decoding format supported by the receiving terminal is lower than the video encoding/decoding format included in the invite message; and obtaining, by the receiving terminal according to the determining, a video encoding/decoding format of a highest specification supported by the receiving terminal, or obtaining the default video encoding/decoding format according to the determining.

With reference to either of the first possible implementation manner and the second possible implementation manner of the second aspect, in a third possible implementation manner, the default video encoding/decoding format is a preset video encoding/decoding format supported by both the sending terminal and the receiving terminal.

According to a third aspect, an embodiment of the present disclosure provides a sending terminal, where the sending terminal includes a sending module configured to send an invite message to a receiving terminal; a receiving module configured to receive a reply message that is sent by the receiving terminal according to the invite message, where the reply message includes a video encoding/decoding format supported by the receiving terminal; an obtaining module configured to determine that a video encoding/decoding format supported by the sending terminal does not include the video encoding/decoding format included in the reply message, and obtain, according to the determining, a video encoding/decoding format supported by both the sending terminal and the receiving terminal; and a communications module configured to perform video communication with the receiving terminal according to the obtained video encoding/decoding format.

In a first possible implementation manner of the third aspect, the obtaining module is configured to determine that a specification of each video encoding/decoding format included in the reply message is higher than that of the video encoding/decoding format supported by the sending terminal; and obtain, according to the determining, a video encoding/decoding format of a highest specification supported by the sending terminal, or obtain a default video encoding/decoding format according to the determining.

With reference to the third aspect, or the first possible implementation manner of the third aspect, in a second possible implementation manner, the obtaining module is configured to determine that each video encoding/decoding format included in the reply message is lower than the video encoding/decoding format supported by the sending terminal; and obtain, according to the determining, a video encoding/decoding format of a lowest specification supported by the sending terminal, or obtain the default video encoding/decoding format according to the determining.

With reference to either of the first possible implementation manner and the second possible implementation manner of the third aspect, in a third possible implementation manner, the default video encoding/decoding format is a preset video encoding/decoding format supported by both the sending terminal and the receiving terminal.

According to a fourth aspect, an embodiment of the present disclosure provides a receiving terminal, where the receiving terminal includes a receiving module configured to receive an invite message sent by a sending terminal, where the invite message includes a video encoding/decoding format supported by the sending terminal; an obtaining module configured to obtain, according to the invite message, a video encoding/decoding format supported by both the receiving terminal and the sending terminal; a sending module configured to send a reply message to the sending terminal, where the reply message includes the obtained video encoding/decoding format; and a communications module configured to perform video communication with the sending terminal according to the obtained video encoding/decoding format.

In a first possible implementation manner of the fourth aspect, the obtaining module is configured to determine that a specification of each video encoding/decoding format supported by the receiving terminal is higher than that of the video encoding/decoding format included in the invite message; and obtain, according to the determining, a video encoding/decoding format of a lowest specification supported by the receiving terminal, or obtain a default video encoding/decoding format according to the determining.

With reference to the fourth aspect, or the first possible implementation manner of the fourth aspect, in a second possible implementation manner, the obtaining module is configured to determine that each video encoding/decoding format supported by the receiving terminal is lower than the video encoding/decoding format included in the invite message; and obtain, according to the determining, a video encoding/decoding format of a highest specification supported by the receiving terminal, or obtain the default video encoding/decoding format according to the determining.

With reference to either of the first possible implementation manner and the second possible implementation manner of the fourth aspect, in a third possible implementation manner, the default video encoding/decoding format is a preset video encoding/decoding format supported by both the sending terminal and the receiving terminal.

According to a fifth aspect, an embodiment of the present disclosure provides a sending terminal, including a memory, a transceiver, and a processor, where the transceiver is configured to send an invite message to a receiving terminal; the transceiver is further configured to receive a reply message that is sent by the receiving terminal according to the invite message, where the reply message includes a video encoding/decoding format supported by the receiving terminal; the processor is configured to determine that a video encoding/decoding format supported by the sending terminal does not include the video encoding/decoding format included in the reply message, and obtain, according to the determining, a video encoding/decoding format supported by both the sending terminal and the receiving terminal; and the processor is further configured to perform video communication with the receiving terminal according to the obtained video encoding/decoding format.

According to a sixth aspect, an embodiment of the present disclosure provides a receiving terminal, including a memory, a transceiver, and a processor, where the transceiver is configured to receive an invite message sent by a sending terminal, where the invite message includes a video encoding/decoding format supported by the sending terminal; the processor is configured to obtain, according to the invite message, a video encoding/decoding format supported by both the receiving terminal and the sending terminal; the transceiver is further configured to send a reply message to the sending terminal, where the reply message includes the obtained video encoding/decoding format; and the processor is further configured to perform video communication with the sending terminal according to the obtained video encoding/decoding format.

According to a seventh aspect, an embodiment of the present disclosure provides a video communications system, where the video communications system includes a sending terminal and a receiving terminal.

According to the video communication method and system, and the terminal provided in the embodiments of the present disclosure, a video encoding/decoding format used for video communication is intelligently obtained, thereby improving a success rate of video communication, and saving electricity and network resources.

BRIEF DESCRIPTION OF DRAWINGS

To describe the technical solutions in the embodiments of the present disclosure or in the prior art more clearly, the following briefly introduces the accompanying drawings required for describing the embodiments. The accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

The terms used in the embodiments of the present disclosure are merely for the purpose of illustrating specific embodiments, and are not intended to limit the present disclosure. The terms "a", "said", and "the" of singular forms used in the embodiments and the appended claims of the present disclosure are also intended to include plural forms, unless otherwise specified in the context clearly. It should also be understood that, the term "and/or" used herein indicates and includes any or all possible combinations of one or more associated listed items. It should be further understood that the term "include" adopted in this specification specifies presence of features, integers, steps, operations, elements, and/or components, with presence or attachment of other features, integers, steps, operations, components, elements, and their combinations not excluded.

In the embodiments of the present disclosure, a terminal includes, but is not limited to, a terminal such as a mobile phone, a personal digital assistant (PDA), a tablet computer, a portable device (such as a portable computer), and an Automatic Teller Machine (ATM).

Figure 1:
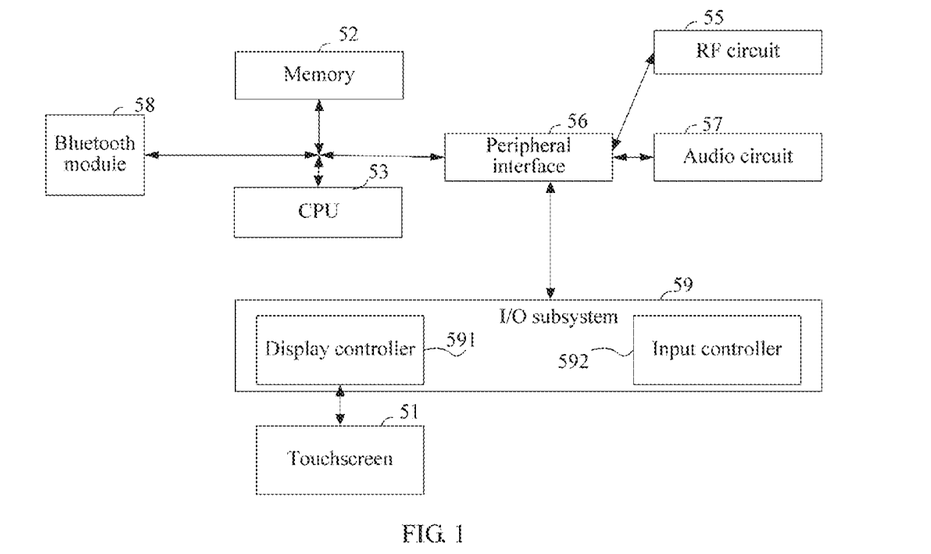
FIG. 1 is a schematic structural diagram of a mobile phone according to the present disclosure.

FIG. 1 is a schematic structural diagram of a mobile phone according to an embodiment of the present disclosure. As shown in FIG. 1, the mobile phone includes a touchscreen 51, a memory 52, a central processing unit (CPU) 53, a radio frequency (RF) circuit 55, a peripheral interface 56, an audio circuit 57, a Bluetooth® module 58, and an input/output (I/O) subsystem 59. It should be understood that the mobile phone shown in FIG. 1 is merely an example of the terminal, and the terminal may have various types, and it should be understood that the mobile phone may be a sending terminal or may be a receiving terminal. The mobile phone may have more or fewer components than those shown in the figure, or may combine two or more components, or may have different components. The components shown in the figure may be implemented in hardware, software, or a combination of hardware and software that includes one or more signal processing and/or application-specific integrated circuits.

The touchscreen 51 may be configured to obtain a control instruction of a user, to implement video communication. The touchscreen 51 is an input interface and an output interface between the mobile phone and the user, and not only has functions of obtaining user touch information and the control instruction, but also displays a visible output to the user. The visible output may include a graphic, a text, an icon, a video, and the like. It should be understood that the control instruction is obtained in various manners. The control instruction may be obtained in another manner, for example, the control information may be obtained in a manner such as pressing a key, and a specific obtaining manner varies according to different performances of the mobile phone.

The memory 52 may be configured to store a program and may be accessed by the CPU 53, the peripheral interface 56, and the like. The CPU 53 executes the program stored in the memory 52 to implement a method of an embodiment of the present disclosure. The memory 52 may include a high-speed random access memory (RAM), and may further include a non-volatile memory, such as one or more magnetic disk storage devices, a flash device, or another volatile solid-state storage device.

The CPU 53 is a control center of the mobile phone, and is connected to various parts of the mobile phone by using various interfaces and lines. By running or executing a software program and/or module stored in the memory 52, and invoking data stored in the memory 52, the CPU 53 performs various functions and data processing of the terminal, thereby performing overall monitoring on the mobile phone. Optionally, the CPU 53 may include one or more processing units. Preferably, the CPU 53 may integrate an application processor and a modem processor. Optionally, the application processor mainly processes an operating system, a user interface, an application program, and the like. The modem processor mainly processes wireless communication. It may be understood that the modem processor may not be integrated into the CPU 53. It should be further understood that the function is only one of functions that the CPU 53 can perform, and other functions are not limited in this embodiment of the present disclosure.

The RF circuit 55 is configured to send and receive a message to establish communication. For example, the RF circuit 55 may be configured to answer a call, receive and send a short message service message and an email, and the like. The RF circuit 55 receives and sends an RF signal, and the RF signal is also referred to as an electromagnetic signal. The RF circuit 55 converts an electrical signal into an electromagnetic signal or converts an electromagnetic signal into an electrical signal, and communicates with a communications network and another device by using the electromagnetic signal. The RF circuit 55 may include a known circuit configured to perform these functions. The known circuit includes, but is not limited to, an antenna system, an RF transceiver, one or more amplifiers, a tuner, one or more oscillators, a digital signal processor, a CODEC chip set, a subscriber identity module (SIM), and the like.

The peripheral interface 56 may connect input and output peripherals of a device to the CPU 53 and the memory 52.

The audio circuit 57 may be mainly configured to obtain audio data from the peripheral interface 56, convert the audio data into an electrical signal, and convert the electrical signal into ringing.

The I/O subsystem 59 may control the input and output peripherals of the device, and the I/O subsystem 59 may include a display controller 591 and one or more input controllers 592 that are configured to control another input/control device. Optionally, the one or more input controllers 592 obtain an electrical signal from the another input/control device or send an electrical signal to the another input/control device, and the another input/control device may include a physical button (a press button, a rocker button, or the like), a dial, a slide switch, a joystick, and a click scroll wheel. It should be noted that the input controller 592 may be connected to any one of the following components: a keyboard, an infrared port, a universal serial bus (USB) port, and an indication device such as a mouse. The display controller 591 in the I/O subsystem 59 obtains an electrical signal from the touchscreen 51 or sends an electrical signal to the touchscreen 51. The touchscreen 51 obtains a touch on the touchscreen; the display controller 591 converts the obtained touch into an interaction with a user interface object displayed on the touchscreen 51, that is, a human-computer interaction. The user interface object displayed on the touchscreen 51 may be a game running icon, an icon connected to a corresponding network, a screening mode, or the like. It should be noted that the device may further include an optical mouse. The optical mouse is a touch-sensitive surface that does not display a visible output, or an extension of a touch-sensitive surface formed by a touchscreen.

Figure 2:
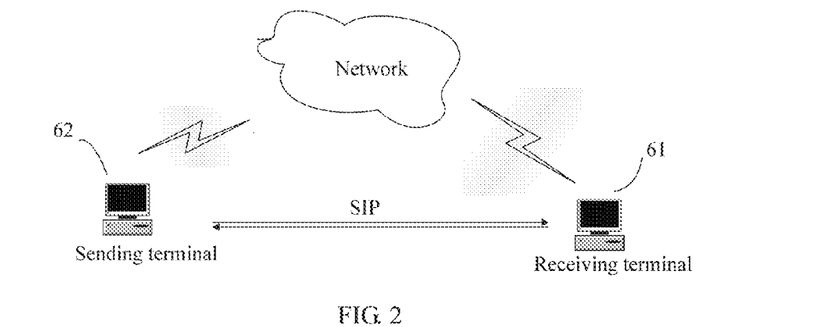
FIG. 2 is a schematic structural diagram of a communications system according to the present disclosure.

The embodiments of the present disclosure provide a video communication method and system, and a terminal. The video communications system provided in an embodiment of the present disclosure is shown in FIG. 2. The video communications system includes a sending terminal 62, and a receiving terminal 61. Video communication may be communication in which the sending terminal 62 and the receiving terminal 61 transmit video content in a communication process, and the video communication may include a video call and video sharing, and is not limited in this embodiment of the present disclosure. During video communication, as shown in FIG. 2, the terminals perform communication by means of a Session Initiation Protocol (SIP) message, the SIP communication message includes a Session Description Protocol (SDP), and the SDP is usually used to negotiate an optimal solution supported by two sides of the video communication, for example, negotiate a video encoding/decoding format supported by both the two sides of the video communication. The sending terminal 62 sends an invite message to the receiving terminal 61, the invite message may be an INVITE, and an SDP in the INVITE describes a video encoding/decoding format supported by the sending terminal 62. After receiving the INVITE, the receiving terminal 61 selects an encoding/decoding format according to a video encoding/decoding condition supported by the receiving terminal 61 and makes a reply in 200 OK. When the receiving terminal 61 has a relatively good network environment or relatively good hardware, the receiving terminal 61 may reply with an encoding/decoding format of a relatively high specification supported by the receiving terminal 61; or may reply with a default encoding/decoding format. According to the reply of the receiving terminal 61, the sending terminal 62 determines whether to perform video transmission.

During video communication, a video encoding/decoding format includes H.261, H.263, H.264, and H.265 of the International Telecommunication Union, an M-JPEG series of the Motion Joint Photographic Experts Group, and an MPEG series of the Moving Picture Experts Group of the International Organization for Standardization. In addition, video encoding/decoding formats widely used on the Internet also include RealVideo of Real-Networks, WMV of Microsoft, and QuickTime of the Apple Company. Generally, each type of video encoding/decoding format has high and low specifications. Using the video encoding/decoding format of the International Telecommunication Union as an example, a larger number indicates a higher specification, that is, H.261 has a specification lower than that of H.263, H.263 has a specification lower than that of H.264, and H.264 has a specification lower than that of H.265. In addition, many video encoding/decoding formats further include sub-formats. Video encoding/decoding formats such as H.263, H.264, and H.265 include sub-formats. Generally, the sub-formats also have high and low specifications. For example, in sub-formats 42900b, 42800c, and 42800d of H.264, 42900b has a specification lower than that of 42800c, and 42800c has a specification lower than that of 42800d. It should be understood that a method for determining a high or a low specification of the video encoding/decoding format is not limited to determining a value of the number, and a person skilled in the art knows multiple determining methods. This is not limited in this embodiment of the present disclosure. Generally, according to a rule of the standards, a video encoding/decoding format that a terminal needs to support, that is, a default video encoding/decoding format, is set in advance for the terminal in RCS. The default video encoding/decoding format is a video encoding/decoding format supported by both the sending terminal and the receiving terminal, and the terminals may perform video communication by using the default video encoding/decoding format. Currently, the default video encoding/decoding format supported by the terminals is 42900b. It should be understood that the default video encoding/decoding format may constantly change with development of technologies and march of time. Therefore, the default video encoding/decoding format is not limited in the present disclosure. It should be further understood that in some cases, a terminal may have no preset default video encoding/decoding format. In this embodiment of the present disclosure, the default video encoding/decoding format may be omitted in an example.

In a current solution, if the SDP in the INVITE describes a 42900b format supported by the sending terminal 62, and the receiving terminal 61 replies with a video encoding/ decoding format of a higher specification such as 42800c supported by the receiving terminal 61 (however, the video encoding/decoding format actually supported by the receiving terminal 61 may include 42900b), the sending terminal 62 searches the video encoding/decoding format supported by the sending terminal 62 for 42800c. If 42800c is not found, the sending terminal 62 stops video transmission (instead of establishing video communication by using 42900b), resulting in a failure in establishing video communication. However, in general cases, if the video encoding format replied by the receiving terminal 61 is higher than the video encoding/decoding format supported by the sending terminal 62, generally, the receiving terminal 61 also supports a video encoding/decoding format of a lower specification, not included in the reply. If the video encoding format replied by the receiving terminal 61 is lower than the video encoding/decoding format supported by the sending terminal 62, the receiving terminal 61 may support a video encoding/decoding format of a higher specification, not included in the reply. If each video encoding format replied by the receiving terminal 61 is higher than or lower than the video encoding/decoding format supported by the sending terminal 62, the sending terminal 62 may further select the default video encoding/decoding format.

Embodiment 1

Figure 3:
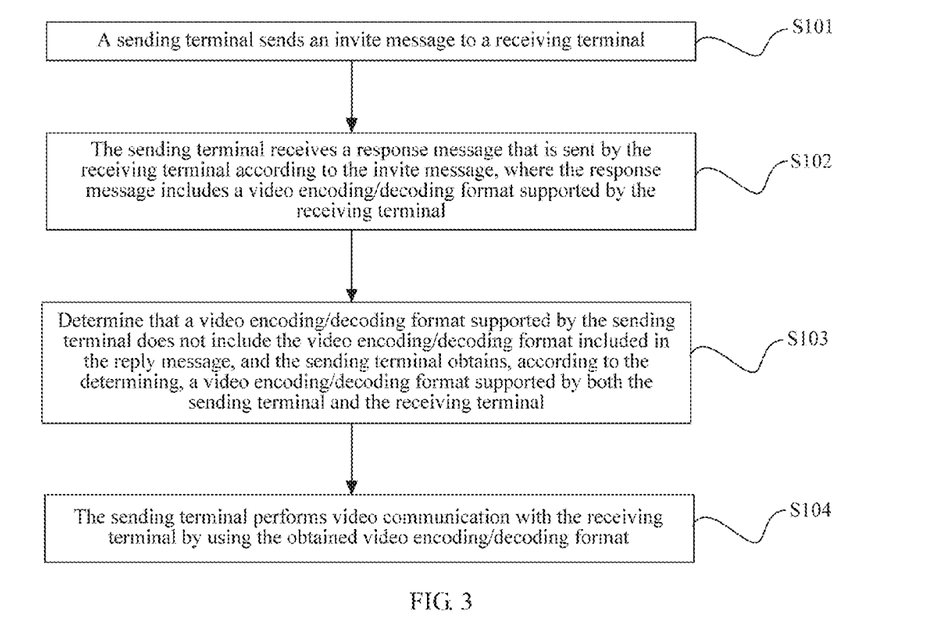
FIG. 3 is a flowchart of a video communication method according to Embodiment 1 of the present disclosure.

FIG. 3 is a flowchart of a video communication method according to Embodiment 1 of the present disclosure.

Step S101: A sending terminal 62 sends an invite message to a receiving terminal 61. Under control of a CPU 53, the sending terminal 62 may send the invite message by using an RF circuit 55. Optionally, the invite message sent by the sending terminal 62 to the receiving terminal 61 may be an INVITE (the INVITE is a SIP message), and an SDP in the INVITE describes a video encoding/decoding format supported by the sending terminal 62. It may be understood that the video encoding/decoding format described by the SDP may be one video encoding/decoding format supported by the sending terminal 62, or may be multiple video encoding/decoding formats supported by the sending terminal 62, or may be all video encoding/decoding formats supported by the sending terminal 62. This is not limited in this embodiment of the present disclosure.

Step S102: The sending terminal 62 receives a response message that is sent by the receiving terminal 61 according to the invite message. Under control of the CPU 53, the sending terminal 62 may receive the reply message by using the RF circuit 55. The response message includes a video encoding/decoding format supported by the receiving terminal 61. Optionally, the response message may be 200 OK (200 OK is a SIP message, and is a reply to the INVITE), and the response message includes the video encoding/decoding format supported by the receiving terminal 61. The response message may include one video encoding/decoding format supported by the receiving terminal 61, or may include multiple video encoding/decoding formats supported by the receiving terminal 61, or may include all video encoding/decoding formats supported by the receiving terminal 61. Generally, the response message usually includes only one video encoding/decoding format supported by the receiving terminal 61. After receiving the INVITE, the receiving terminal 61 replies, according to a current network condition or a hardware condition of the receiving terminal 61, with a video encoding/decoding format supported by the receiving terminal 61. For example, when the receiving terminal 61 currently has a good network condition, the receiving terminal 61 may reply with a video encoding/decoding format of a relatively high specification, or when the receiving terminal 61 has a good hardware condition, the receiving terminal 61 may reply with a video encoding/decoding format of a relatively high specification. In some cases, after receiving the INVITE, the receiving terminal 61 replies with a default video encoding/decoding format.

S103: Determine that a video encoding/decoding format supported by the sending terminal 62 does not include the video encoding/decoding format included in the reply message, and the sending terminal 62 obtains, according to the determining, a video encoding/decoding format supported by both the sending terminal 62 and the receiving terminal 61. Under control of the CPU 53, the sending terminal 62 compares, by executing a program stored in a memory 52, the received video encoding/decoding format included in the reply message with the video encoding/decoding format that is stored in the memory 52 of the sending terminal 62 and that is supported by the sending terminal 62, and determines that the video encoding/decoding format supported by the sending terminal 62 does not include the video encoding/decoding format included in the reply message. In this case, the sending terminal 62 does not yet consider that SDP negotiation fails, does not stop video communication, and obtains the video encoding/decoding format supported by both the sending terminal 62 and the receiving terminal 61.

Optionally, step S103 includes S1031 of determining that a specification of each video encoding/decoding format included in the reply message is higher than that of the video encoding/decoding format supported by the sending terminal 62; and obtaining, by the sending terminal 62 according to the determining, a video encoding/decoding format of a highest specification supported by the sending terminal 62, or obtaining a default video encoding/decoding format according to the determining.

The sending terminal 62 determines, by executing a program stored in the memory 52 by using the CPU 53, that a specification of each video encoding/decoding format included in the response message is higher than that of the video encoding/decoding format supported by the sending terminal 62, and the sending terminal 62 obtains the video encoding/decoding format of the highest specification supported by the sending terminal 62. Alternatively, the sending terminal 62 obtains the default video encoding/decoding format. For example, a video encoding/decoding format included in the reply message is 42800c, and a video encoding/decoding format included in the invite message is 42900b, that is, the video encoding/decoding format included in the reply message is higher than the video encoding/decoding format supported by the sending terminal 62. In this case, the sending terminal 62 selects the video encoding/decoding format of the highest specification from a list of video encoding/decoding formats supported by the sending terminal 62, and uses the video encoding/decoding format as a video encoding/decoding format used for video communication. Alternatively, the sending terminal 62 uses a default video encoding/decoding format 42900b as a video encoding/decoding format used for video communication.

In this embodiment of the present disclosure, the sending terminal 62 obtains a video encoding/decoding format of a highest specification supported by both the receiving terminal 61 and the sending terminal 62, thereby improving quality of video communication.

Optionally, step S103 includes S1032 of determining that the video encoding/decoding format included in the reply message is lower than the video encoding/decoding format supported by the sending terminal 62; and obtaining, by the sending terminal 62 according to the determining, a video encoding/decoding format of a lowest specification supported by the sending terminal 62, or obtaining the default video encoding/decoding format according to the determining.

The sending terminal 62 determines, by executing the program stored in the memory 52 by using the CPU 53, that the specification of the video encoding/decoding format included in the response message is lower than that of the video encoding/decoding format supported by the sending terminal 62, and the sending terminal 62 obtains the video encoding/decoding format of the lowest specification supported by the sending terminal 62. Alternatively, the sending terminal 62 obtains the default video encoding/decoding format. For example, a video encoding/decoding format included in the reply message is H.261, and video encoding/decoding formats included in the invite message are H.263 and H.264, that is, the video encoding/decoding format included in the reply message is lower than the video encoding/decoding formats supported by the sending terminal 62. In this case, the sending terminal 62 obtains the video encoding/decoding format H.263 of the lowest specification supported by the sending terminal 62, as the video encoding/decoding format used for video communication. Alternatively, the sending terminal 62 may use a default video encoding/decoding format 42900b as the video encoding/decoding format used for video communication.

In this embodiment of the present disclosure, the sending terminal 62 obtains a video encoding/decoding format of a highest specification supported by both the receiving terminal 61 and the sending terminal 62, thereby improving quality of video communication.

S104: The sending terminal 62 performs video communication with the receiving terminal 61 by using the obtained video encoding/decoding format. Under control of the CPU 53, the sending terminal 62 returns an acknowledgement message (ACK) by using the RF circuit 55, and the message includes the obtained video encoding/decoding format. The sending terminal 62 transmits an Real-time Transport Protocol (RTP) stream of video data by using the video encoding/decoding format, the sending terminal 62 performs encoding according to the obtained video encoding/decoding format, and the receiving terminal 61 performs decoding according to the obtained video encoding/decoding format, so as to perform video communication.

It may be understood that the video encoding/decoding format obtained by the sending terminal 62 is a video encoding/decoding format that is selected by the sending terminal 62 under control of the CPU 53 and supported by the sending terminal 62, and that may be supported by the receiving terminal 61 at a high possibility, but there is a possibility that in an extremely rare case, the receiving terminal 61 does not support the video encoding/decoding format. Therefore, there is still a possibility that the sending terminal 62 may fail to perform video communication with the receiving terminal 61 by using the obtained video encoding/decoding format. However, according to the video communication method provided in this embodiment of the present disclosure, the sending terminal 62 intelligently obtains a video encoding/decoding format used for video communication, thereby improving a success rate of video communication, and saving electricity and network resources. Therefore, although it is not ensured that video communication can be successfully established according to the method provided in this embodiment of the present disclosure, compared with the prior art, a success rate of video communication can be greatly improved, and it is avoided that video communication cannot be established between the receiving terminal 61 and the sending terminal 62 when there is a video encoding/decoding format supported by both the receiving terminal 61 and the sending terminal 62.

Figure 4:
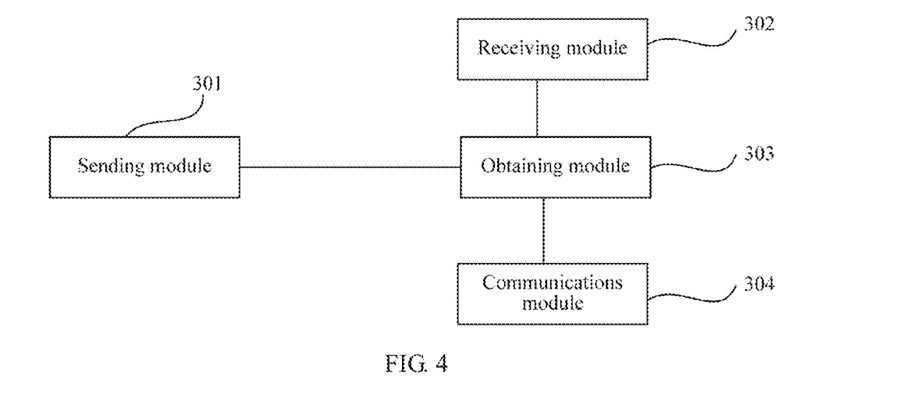
FIG. 4 is a schematic structural diagram of a sending terminal according to Embodiment 1 of the present disclosure.

FIG. 4 is a schematic structural diagram of a sending terminal 62 according to Embodiment 1 of the present disclosure. It should be noted that in addition to the units described above, the terminal of this embodiment further has other units for implementing a function of the terminal, the units are not limited in this embodiment, and the units are not shown in the accompanying figure.

As shown in FIG. 4, the sending terminal 62 may include a sending module 301 configured to send an invite message to a receiving terminal 61; a receiving module 302 configured to receive a reply message that is sent by the receiving terminal 61 according to the invite message, where the reply message includes a video encoding/decoding format supported by the receiving terminal 61; an obtaining module 303 configured to determine that a video encoding/decoding format supported by the sending terminal 62 does not include the video encoding/decoding format included in the reply message, and obtain, according to the determining, a video encoding/decoding format supported by both the sending terminal 62 and the receiving terminal 61; and a communications module 304 configured to perform video communication with the receiving terminal 61 according to the obtained video encoding/decoding format.

The sending module 301, the receiving module 302, the obtaining module 303, and the communications module 304 may be respectively configured to perform steps S101, S102, S103, and S104 in the method of Embodiment 1. For details, refer to descriptions of the method in Embodiment 1, and details are not described herein again.

Optionally, the obtaining module 303 is configured to determine that a specification of each video encoding/decoding format included in the reply message is higher than that of the video encoding/decoding format supported by the sending terminal 62; and obtain, according to the determining, a video encoding/decoding format of a highest specification supported by the sending terminal 62, or obtain a default video encoding/decoding format according to the determining. For details of the method used by the obtaining module 303 to perform S1031 in Embodiment 1, refer to descriptions of the method in Embodiment 1, and details are not described herein again.

Optionally, the obtaining module 303 is configured to determine that each video encoding/decoding format included in the reply message is lower than the video encoding/decoding format supported by the sending terminal 62; and obtain, according to the determining, a video encoding/decoding format of a lowest specification supported by the sending terminal 62, or obtain the default video encoding/decoding format according to the determining. For details of the method used by the obtaining module 303 to perform S1032 in Embodiment 1, refer to descriptions of the method in Embodiment 1, and details are not described herein again.

According to the sending terminal 62 provided in this embodiment of the present disclosure, the sending terminal 62 intelligently obtains a video encoding/decoding format used for video communication, thereby improving a success rate of video communication, and saving electricity and network resources.

Embodiment 2

Figure 5:
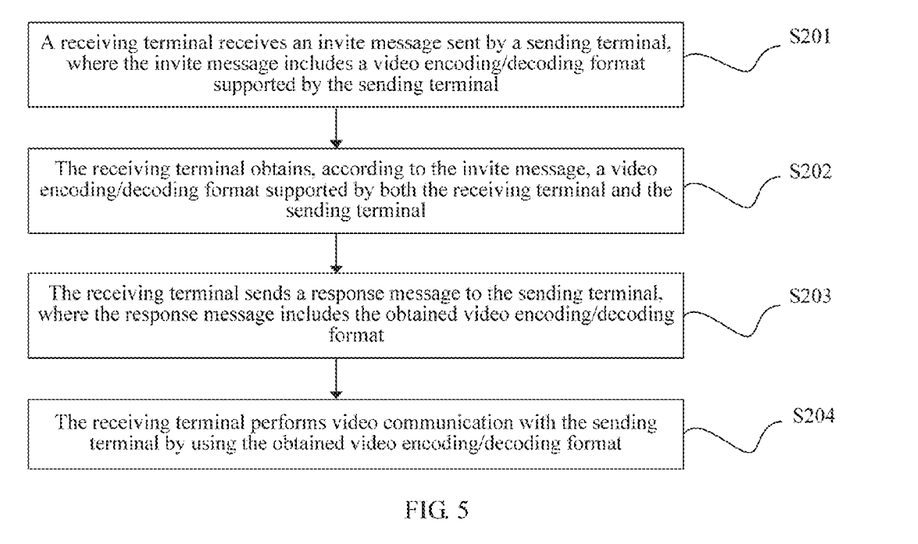
FIG. 5 is a flowchart of another video communication method according to Embodiment 2 of the present disclosure.

FIG. 5 is a flowchart of another video communication method according to Embodiment 2 of the present disclosure.

As shown in FIG. 5, the method may include the following steps.

S201: A receiving terminal 61 receives an invite message sent by a sending terminal 62, where the invite message includes a video encoding/decoding format supported by the sending terminal 62.

Under control of a CPU 53, the receiving terminal 61 may receive the invite message by using an RF circuit 55, and the invite message is the same as the invite message in S101. For details, refer to descriptions of the invite message in S101, and details are not described again in this embodiment of the present disclosure.

S202: The receiving terminal 61 obtains, according to the invite message, a video encoding/decoding format supported by both the receiving terminal 61 and the sending terminal 62.

Under control of the CPU 53, the receiving terminal 61 obtains, by executing a program stored in a memory 52 and according to the video encoding/decoding format included in the received invite message, and a video encoding/decoding format supported by the receiving terminal 61, the video encoding/decoding format supported by both the receiving terminal 61 and the sending terminal 62.

Optionally, S202 includes S2021 of determining that a video encoding/decoding format supported by the receiving terminal 61 includes at least one video encoding/decoding format included in the invite message; and obtaining, by the receiving terminal 61, the video encoding/decoding format according to the determining. Optionally, if the video encoding/decoding format supported by the receiving terminal 61 includes multiple video encoding/decoding formats included in the invite message, the receiving terminal 61 selects to obtain a video encoding/decoding format of a highest specification. For example, the invite message includes H.263 and H.264, and the video encoding format supported by the receiving terminal 61 includes H.264 and H.265. In this case, the receiving terminal 61 obtains H.264 as a video encoding/decoding format used for video communication.

Optionally, S202 includes S2022 of determining that a specification of each video encoding/decoding format supported by the receiving terminal 61 is higher than that of the video encoding/decoding format included in the invite message; and obtaining, by the receiving terminal 61 according to the determining, a video encoding/decoding format of a lowest specification supported by the receiving terminal 61, or obtaining a default video encoding/decoding format according to the determining. For example, the invite message includes H.263, and the video encoding format supported by the receiving terminal 61 includes H.264 and H.265. In this case, the receiving terminal 61 obtains H.264 as a video encoding/decoding format used for video communication or obtains 42900b as a video encoding/decoding format used for video communication.

Optionally, S202 includes S2023 of determining that each video encoding/decoding format supported by the receiving terminal 61 is lower than the video encoding/decoding format included in the invite message; and obtaining, by the receiving terminal 61 according to the determining, a video encoding/decoding format of a highest specification supported by the receiving terminal 61, or obtaining the default video encoding/decoding format according to the determining. For example, the invite message includes H.264 and H.265, and the video encoding format supported by the receiving terminal 61 includes H.263 and H.261. In this case, the receiving terminal 61 obtains H.263 as a video encoding/decoding format used for video communication, or obtains 42900b as a video encoding/decoding format used for video communication. In this embodiment of the present disclosure, the receiving terminal 61 obtains a video encoding/decoding format of a highest specification supported by both the receiving terminal 61 and the sending terminal 62, thereby improving quality of video communication.

S203: The receiving terminal 61 sends a response message to the sending terminal 62, where the response message includes the obtained video encoding/decoding format.

Under control of the CPU 53, the receiving terminal 61 may send the obtained video encoding/decoding format to the sending terminal 62 by means of the reply message by using the RF circuit 55. The reply message may be 200 OK. The reply message is the same as the reply message in step S102 of Embodiment 1, and details are not described again in this embodiment of the present disclosure.

S204: The receiving terminal 61 performs video communication with the sending terminal 62 by using the obtained video encoding/decoding format.

The receiving terminal 61 transmits an RTP of video data by using the video encoding/decoding format, the receiving terminal 61 performs decoding according to the obtained video encoding/decoding format, and the sending terminal 62 performs encoding according to the obtained video encoding/decoding format.

It may be understood that the video encoding/decoding format obtained by the receiving terminal 61 is a video encoding/decoding format that is selected by the receiving terminal 61 under control of the CPU 53 and supported by the receiving terminal 61, and that may be supported by the sending terminal 62 at a high possibility, but there is a possibility that in an extremely rare case, the sending terminal 62 does not support the video encoding/decoding format. Therefore, there is still a possibility that the receiving terminal 61 may fail to perform video communication with the sending terminal 62 by using the obtained video encoding/decoding format. However, according to the video communication method provided in this embodiment of the present disclosure, the receiving terminal 61 intelligently obtains a video encoding/decoding format used for video communication, thereby improving a success rate of video communication, and saving electricity and network resources. Therefore, although it is not ensured that video communication can be successfully established according to the method provided in this embodiment of the present disclosure, compared with the prior art, a success rate of video communication can be greatly improved, and it is avoided that video communication cannot be established between the receiving terminal 61 and the sending terminal 62 when there is a video encoding/decoding format supported by both the receiving terminal 61 and the sending terminal 62.

Figure 6:
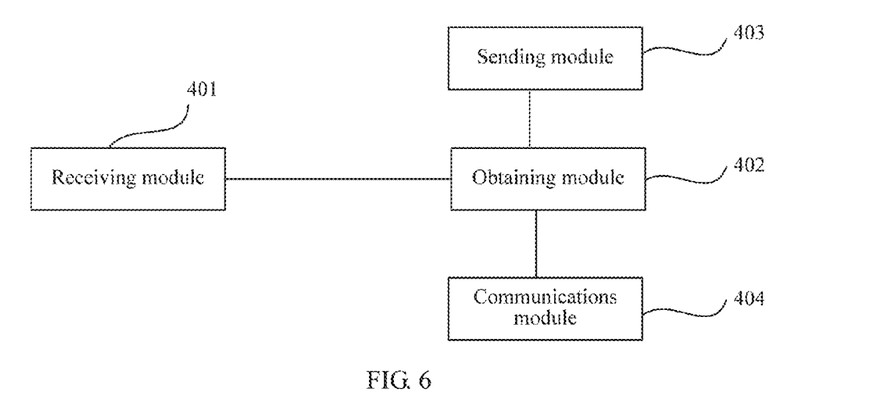
FIG. 6 is a schematic structural diagram of a receiving terminal according to Embodiment 2 of the present disclosure.

FIG. 6 is a schematic structural diagram of a receiving terminal 61 according to Embodiment 2 of the present disclosure. It should be noted that in addition to the units described above, the terminal of this embodiment further has other units for implementing a function of the terminal, the units are not limited in this embodiment, and the units are not shown in the accompanying figure.

As shown in FIG. 6, the receiving terminal 61 may include a receiving module 401 configured to receive an invite message sent by a sending terminal 62, where the invite message includes a video encoding/decoding format supported by the sending terminal 62; an obtaining module 402 configured to obtain, according to the invite message, a video encoding/decoding format supported by both the receiving terminal 61 and the sending terminal 62; a sending module 403 configured to send a reply message to the sending terminal 62, where the reply message includes the obtained video encoding/decoding format; and a communications module 404 configured to perform video communication with the sending terminal 62 according to the obtained video encoding/decoding format.

The receiving module 401, the obtaining module 402, the sending module 403, and the communications module 404 may be respectively configured to perform steps S202, S202, S203, and S204 in the method of Embodiment 2. For details, refer to descriptions of the method in Embodiment 2, and details are not described herein again.

Optionally, the obtaining module 402 is further configured to perform steps S2021, S2022, and S2023 in the method of Embodiment 2. For details, refer to descriptions of the method in Embodiment 2, and details are not described herein again.

According to the receiving terminal 61 provided in this embodiment of the present disclosure, the receiving terminal 61 intelligently obtains a video encoding/decoding format used for video communication, thereby improving a success rate of video communication, and saving electricity and network resources.

Embodiment 3

Figure 7:
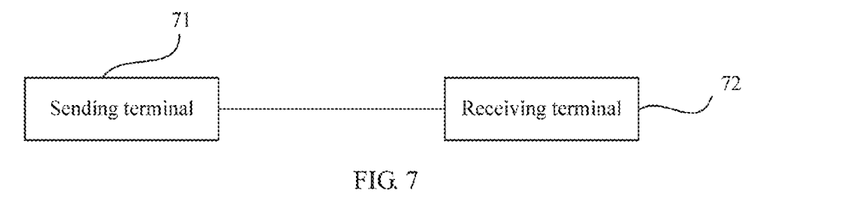
FIG. 7 is a schematic structural diagram of a video communications system according to Embodiment 3 of the present disclosure.

FIG. 7 is a schematic structural diagram of a video communications system according to Embodiment 3 of the present disclosure.

As shown in FIG. 7, the video communications system may include a sending terminal 71 and a receiving terminal 72. The sending terminal 71 is configured to perform steps S101, S102, S103, and S104 in the method of Embodiment 1. For details, refer to descriptions of the foregoing steps in Embodiment 1, and details are not described again in this embodiment of the present disclosure. The receiving terminal 72 is configured to perform steps S201, S202, S203, and S204 in the method of Embodiment 2. For details, refer to descriptions of the foregoing steps in Embodiment 2, and details are not described again in this embodiment of the present disclosure.

According to the communications system provided in this embodiment of the present disclosure, a video encoding/decoding format used for video communication is intelligently obtained, thereby improving a success rate of video communication, and saving electricity and network resources.

With descriptions of the foregoing embodiments, a person skilled in the art may clearly understand that the embodiments of the present disclosure may be implemented by hardware, firmware or a combination thereof. When the present disclosure is implemented by software, the foregoing functions may be stored in a terminal-readable medium or transmitted as one or more instructions or code in the terminal-readable medium. The terminal-readable medium includes a terminal storage medium and a communications medium, where the available communications medium includes any medium that enables a terminal program to be transmitted from one place to another. The storage medium may be any available medium accessible to a terminal. The following provides an example but does not impose a limitation: The terminal-readable medium may include a random access memory (RAM), a read-only memory (ROM), an electrically erasable programmable read-only memory (EEPROM), a compact disc read-only memory (CD-ROM), or another optical disc storage or a disk storage medium, or another magnetic storage terminal device, or any other medium that can carry or store expected program code in a form of an instruction or a data structure and can be accessed by a terminal. In addition, any connection may be appropriately defined as a terminal-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in definition of a medium to which they belong. For example, a disk and disc used by the embodiments of the present disclosure includes a compact disc (CD), a laser disc, an optical disc, a digital versatile disc (DVD), a floppy disk and a Blu-ray disc, where the available disk generally copies data by a magnetic means, and the disc copies data optically by a laser means. The foregoing combination should also be included in the protection scope of the terminal-readable medium.

In short, the foregoing descriptions are only embodiments of the technical solutions of the present disclosure, but are not intended to limit the protection scope of the present disclosure. Any modification, equivalent replacement, or improvement made without departing from the spirit and principle of the present disclosure shall fall within the protection scope of the present disclosure.

What is claimed is:

1. A video communication method, comprising:
   sending, by a sending terminal, an invite message to a receiving terminal;
   receiving, by the sending terminal, a reply message from the receiving terminal according to the invite message, wherein the reply message comprises at least one first video encoding/decoding format supported by the receiving terminal;
   determining, by the sending terminal, that each of the at least one first video encoding/decoding format supported by the receiving terminal is not supported by the sending terminal by determining that a specification of each of the at least one first video encoding/decoding format is higher than that of each video encoding/decoding format supported by the sending terminal;
   obtaining, by the sending terminal according to the determining, a second video encoding/decoding format supported by both the sending terminal and the receiving terminal by obtaining, according to the determining, a video encoding/decoding format of a highest specification supported by the sending terminal; and
   performing, by the sending terminal, video communication with the receiving terminal by using the second video encoding/decoding format.

2. A video communication method, comprising:
   receiving, by a receiving terminal, an invite message from a sending terminal, wherein the invite message comprises at least one first video encoding/decoding format supported by the sending terminal;
   obtaining, by the receiving terminal according to the invite message, a second video encoding/decoding format supported by both the receiving terminal and the sending terminal by:
     determining that a specification of each video encoding/decoding format supported by the receiving terminal is higher than that of each of the at least one first video encoding/decoding format; and
     obtaining, according to the determining, a video encoding/decoding format of a lowest specification supported by the receiving terminal as the second video encoding/decoding format;

sending, by the receiving terminal, a reply message to the sending terminal, wherein the reply message comprises the second video encoding/decoding format; and performing, by the receiving terminal, video communication with the sending terminal by using the second video encoding/decoding format.

3. A sending terminal, comprising:

at least one processor; and at least one memory coupled to the at least one processor, wherein the at least one memory comprising instructions that when executed by the at least one processor, cause the sending terminal to:

send an invite message to a receiving terminal;

receive a reply message from the receiving terminal according to the invite message, wherein the reply message comprises at least one first video encoding/decoding format supported by the receiving terminal;

determine that each of the at least one first video encoding/decoding format supported by the receiving terminal is not supported by the sending terminal by determining that a specification of each of the at least one first video encoding/decoding format is higher than that of each video encoding/decoding format supported by the sending terminal;

obtain, according to the determining, a second video encoding/decoding format supported by both the sending terminal and the receiving terminal by obtaining a video encoding/decoding format of a highest specification supported by the sending terminal; and perform video communication with the receiving terminal by using the second video encoding/decoding format.

4. A video communication method, comprising:

sending, by a sending terminal, an invite message to a receiving terminal;

receiving, by the sending terminal, a reply message from the receiving terminal according to the invite message, wherein the reply message comprises at least one first video encoding/decoding format supported by the receiving terminal;

determining, by the sending terminal, that each of the at least one first video encoding/decoding format supported by the receiving terminal is not supported by the sending terminal by determining that a specification of each of the at least one first video encoding/decoding format is lower than that of each video encoding/decoding format supported by the sending terminal;

obtaining, by the sending terminal according to the determining, a second video encoding/decoding format supported by both the sending terminal and the receiving terminal by obtaining, according to the determining, a video encoding/decoding format of a lowest specification supported by the sending terminal; and performing, by the sending terminal, video communication with the receiving terminal by using the second video encoding/decoding format.

5. A video communication method, comprising:

receiving, by a receiving terminal, an invite message from a sending terminal, wherein the invite message comprises at least one first video encoding/decoding format supported by the sending terminal;

obtaining, by the receiving terminal according to the invite message, a second video encoding/decoding format supported by both the receiving terminal and the sending terminal by:

determining, by the receiving terminal, that a specification of each video encoding/decoding format supported by the receiving terminal is lower than that of each of the at least one first video encoding/decoding format; and obtaining, by the receiving terminal according to the determining, a video encoding/decoding format of a highest specification supported by the receiving terminal as the second video encoding/decoding format;

sending, by the receiving terminal, a reply message to the sending terminal, wherein the reply message comprises the second video encoding/decoding format; and performing, by the receiving terminal, video communication with the sending terminal by using the second video encoding/decoding format.

6. A sending terminal, comprising:

at least one processor; and at least one memory coupled to the at least one processor, wherein the at least one memory comprising instructions that when executed by the at least one processor, cause the sending terminal to:

send an invite message to a receiving terminal;

receive a reply message from the receiving terminal according to the invite message, wherein the reply message comprises at least one first video encoding/decoding format supported by the receiving terminal;

determine that each of the at least one first video encoding/decoding format supported by the receiving terminal is not supported by the sending terminal by determining that a specification of each of the at least one first video encoding/decoding format is lower than that of each video encoding/decoding format supported by the sending terminal;

obtain, according to the determining, a second video encoding/decoding format supported by both the sending terminal and the receiving terminal by obtaining, according to the determining, a video encoding/decoding format of a lowest specification supported by the sending terminal; and perform video communication with the receiving terminal by using the second video encoding/decoding format.

* * * * *

UNITED STATES PATENT AND TRADEMARK OFFICE
CERTIFICATE OF CORRECTION

| | | |
|---|---|---|
| PATENT NO. | : 9,998,704 B2 | Page 1 of 1 |
| APPLICATION NO. | : 15/540879 | |
| DATED | : June 12, 2018 | |
| INVENTOR(S) | : Hu | |

It is certified that error appears in the above-identified patent and that said Letters Patent is hereby corrected as shown below:

On the Title Page

Under (*) Notice should read:
Subject to any disclaimer, the term of this patent is extended or adjusted under 35 U.S.C. 154(b) by 0 days.

Signed and Sealed this
Thirty-first Day of July, 2018

Andrei Iancu
*Director of the United States Patent and Trademark Office*